May 15, 1923.
G. L. TULLY ET AL
OPHTHALMIC MOUNTING
Filed April 24, 1922
1,455,512
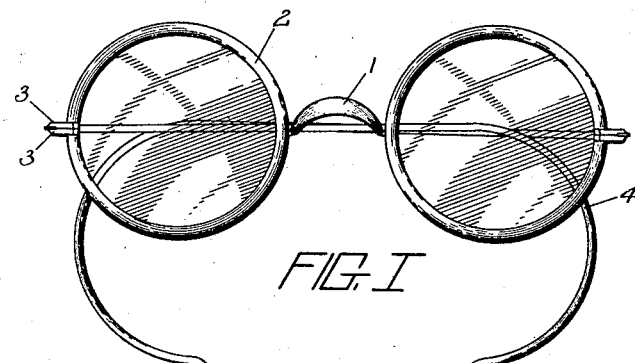
FIG. I
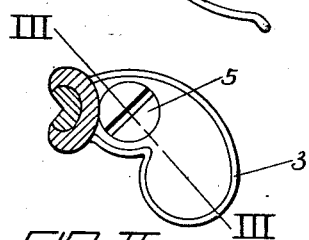
FIG. II
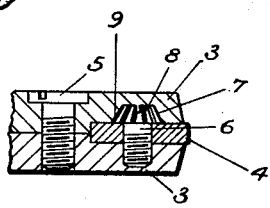
FIG. III
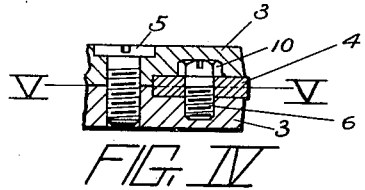
FIG. IV
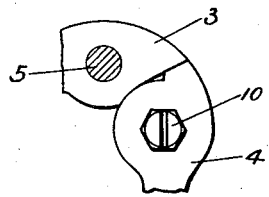
FIG. V
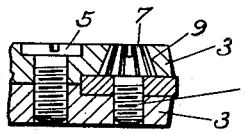
FIG. VI
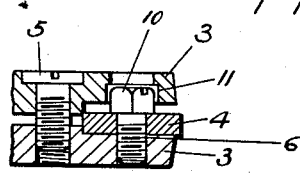
FIG. VII
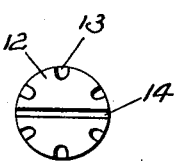
FIG. IX
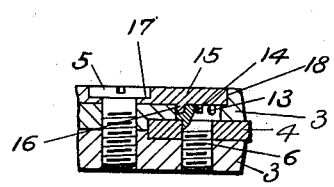
FIG. VIII
INVENTOR
GEORGE L. TULLY
WILLIAM H. BOUTELLE
BY
H. H. Styll & A. K. Parsons
ATTORNEYS Patented May 15, 1923.

1,455,512

UNITED STATES PATENT OFFICE.

GEORGE L. TULLY, OF SOUTHBRIDGE, AND WILLIAM H. BOUTELLE, OF STURBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed April 24, 1922. Serial No. 556,158.

*To all whom it may concern:*

Be it known that we, GEORGE L. TULLY and WILLIAM H. BOUTELLE, citizens of the United States, residing at Southbridge and Sturbridge, respectively, in the county of Worcester and State of Massachusetts, have invented certain new and useful Improvements in Ophthalmic Mountings, of which the following is a specification.

This invention relates to improvements in ophthalmic mountings and has particular reference to mountings of the spectacle type.

One of the principal objects of the present invention is the provision of a mounting of this character in which the temple shall be most securely held and possibility of accidental loosening of same reduced to a minimum.

A further object of the present invention is the provision of a novel and improved structure which shall embody means for locking the retaining device in desired adjusted position.

A further object of the invention is the provision of a structure in which the temple retaining member may be made entirely invisible if desired.

Other objects and advantages of our improvement should be readily apparent by reference to the following specification taken in connection with the accompanying drawings, and it will be understood that we may make any modifications in the specific details of construction shown and described within the scope of the appended claims without departing from or exceeding the spirit of the invention.

Figure I is a front view of a mounting embodying our improvements.

Figure II is an enlarged fragmentary view particularly illustrating the end piece appearance.

Figure III is a sectional view taken as on the line III—III of Figure II.

Figure IV is a similar sectional view illustrating a modified form of fastening device.

Figure V is a sectional view as on the line V—V of Figure IV.

Figure VI is a view similar to Figure III illustrating an exposed form of temple fastening member.

Figure VII is a similar view illustrating the manner of adjustment of a slightly modified form.

Fig. VIII is a sectional view illustrating the use of a cap member.

Figure IX is a plan view of the securing screw employed in connection with said cap member.

In the drawings, the numeral 1 designates a spectacle bridge having secured to each end a lens encircling rim or frame member 2, said members being provided with the end pieces 3 between which are pivotally secured the temples 4 for retaining the mounting in position on the face.

Numerous methods have been adopted in the past of securing the temples 4 in position, some of which depend on the clamping action of a single end piece connecting screw generally similar to the screw 5 here illustrated, while others have made use of a separate clamping screw. Both of these have been subject, however, to considerable difficulty in use, since when a single screw is employed the end piece members 3 being separate from each other or split as at 4 tend to bend or spring apart allowing the temple to become entirely slack, while with the use of a separate fastening device the pivotal movement of the temple has caused the same to work loose.

It is, therefore, the purpose of our invention to eliminate these difficulties. This we accomplish in the form shown in Figures II and III by employing the temple retaining pivot screw member 6 having the frustro-conical head 7 provided with the serrations as at 8, while the end piece is formed with a countersunk or blind socket as at 9 also interiorly serrated and interlocking with the serrations 8 to lock the screw against any loosening. This permits the separation of the two end piece members and the tightening of the screw 6 to securely clamp and hold the temple 4, after which the cap forming end piece 3 is placed in position and the screw 5 tightened, thus drawing the wall of the socket 9 against the screw head 7 when the serrations will interlock and prevent loosening movement of the screw, while the strain of the temple movement comes against the screw only and does not, therefore, tend to spring loose or separate the end piece ears.

Figure IV illustrates a slight modification of this construction, in which a screw head 10 of hexagonal shape in cross section, as shown in Figure V, is employed, in place of the frustro-conical serrated one, the socket being correspondingly stamped out. The distinction here is that the adjustment of the screw in this case for proper fitting must be one-sixth of a turn, so that the hex head will fit in its proper position in the hexagonal socket.

Figure VI illustrates a slight modification of the structure of Figure III, in that instead of a blind socket an open top socket 9 is employed so that the screw head 7 is exposed. This has the advantage that upon loosening of the screw 5 the end piece may be opened up to disengage the serrations when the temple screw may be loosened or tightened as desired and the screw again tightened without separation of the parts, as is necessary with the form shown in Figure III.

In Figure VII we similarly make use of this principle, with the exception that in this form the hexagonal headed screw 10 is made use of and the socket is hexagonal at its top to fit the screw head, the lower part being bored out as at 11 of sufficient size to permit free rotation of the head for adjustment purposes.

Figures VIII and IX illustrate another modification in which instead of the end piece ear 3 itself forming the lock for the temple screw, the screw head 12 is provided with the notches 13 supplementing the screw driver receiving notch 14 and a cap plate 15 is employed having on its under side a lug or projection 16 for selective engagement in any one of the notches 13. This cap plate is held in place by the shoulder as at 17 on the screw 5, a recess 18 being formed in the face of the end piece ear to receive the cap so that the cap serves on tightening of the screw 5 both as a lock for the screw 6 and also to conceal the head of the same.

We claim:

1. In a device of the character described, the combination with an end piece, of a temple, means for pivoting the temple to the end piece, a cap member interlocking with the pivot, and means for detachably securing the cap member in interlocked position.

2. The combination with an end piece having a temple receiving recess, of a temple fitting within the recess, a rotatable pivot carried by the end piece and securing the temple within the recess, a cap member having portions interlocking with the pivot to prevent rotation thereof, and means for securing the cap member in operative position.

3. In a device of the character described, the combination with a pair of end pieces and a temple, of a pivot for connecting the temple and end pieces, said pivot having threaded engagement with one of the end pieces and the other of the end pieces having means interlocking with the pivot to secure it in desired rotatively adjusted position.

GEORGE L. TULLY.
WILLIAM H. BOUTELLE.